(12) United States Patent
Sakurai et al.

(10) Patent No.: US 7,958,210 B2
(45) Date of Patent: Jun. 7, 2011

(54) UPDATE MANAGEMENT METHOD AND UPDATE MANAGEMENT UNIT

(75) Inventors: Hideki Sakurai, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 12/395,147

(22) Filed: Feb. 27, 2009

(65) Prior Publication Data
US 2009/0240791 A1    Sep. 24, 2009

(30) Foreign Application Priority Data
Mar. 19, 2008    (JP) ................................. 2008-070916

(51) Int. Cl.
*G06F 15/177*    (2006.01)
(52) U.S. Cl. ........................ 709/221; 709/220
(58) Field of Classification Search ........... 709/220–232
See application file for complete search history.

(56) References Cited

U.S. PATENT DOCUMENTS

| | | | |
|---|---|---|---|
| 7,130,897 B2 * | 10/2006 | Dervin et al. ................. | 709/221 |
| 7,260,818 B1 * | 8/2007 | Iterum et al. .................. | 717/170 |
| 7,360,208 B2 * | 4/2008 | Joshi et al. ..................... | 717/168 |
| 2004/0078455 A1 * | 4/2004 | Eide et al. ...................... | 709/223 |
| 2005/0188126 A1 | 8/2005 | Mashima et al. | |
| 2009/0119655 A1 * | 5/2009 | Quilty ........................... | 717/168 |
| 2009/0144720 A1 * | 6/2009 | Roush et al. ................... | 717/171 |

FOREIGN PATENT DOCUMENTS

| | | |
|---|---|---|
| JP | A 10-334020 | 12/1998 |
| JP | 2005-242574 | 9/2005 |
| JP | 2005-352778 | 12/2005 |

* cited by examiner

*Primary Examiner* — Yasin Barqadle
(74) *Attorney, Agent, or Firm* — Greer, Burns & Crain, Ltd.

(57) ABSTRACT

A management node for managing a program update time refers to an update management table in which a plurality of managed nodes are classified into a plurality of groups and the sequence of program updating of the groups is defined. The management node sequentially selects the groups in accordance with the sequence of program updating in such a manner that after program updating processing has been completed in all managed nodes included in the selected group, the next group is selected. The management node refers to the update management table, transmits a program update request to each of the managed nodes included in the selected group, receives an update completion notification from the managed node, and notifies update management information storing means that the update processing has been completed in the managed node.

9 Claims, 11 Drawing Sheets

FIG. 5

UPDATE MANAGEMENT INFORMATION STORAGE UNIT 120

| GROUP ID | ACTIVATION SEQUENCE | NODE ID | COPY STATUS | ACTIVATION STATUS |
|---|---|---|---|---|
| GROUP #1 | 1 | NODE #1 | COMPLETED | COMPLETED |
| | | NODE #2 | COMPLETED | COMPLETED |
| | | NODE #3 | COMPLETED | UNCOMPLETED |
| GROUP #2 | 2 | NODE #4 | COMPLETED | UNCOMPLETED |
| | | NODE #5 | COMPLETED | UNCOMPLETED |
| | | NODE #6 | COMPLETED | UNCOMPLETED |

121

UPDATE MANAGEMENT METHOD AND UPDATE MANAGEMENT UNIT

CROSS-REFERENCE TO RELATED APPLICATIONS

This application is based upon and claims the benefit of priority of Japanese Patent Application No. 2008-70916, filed on Mar. 19, 2008, the entire contents of which are incorporated herein by reference.

FIELD

This embodiment relates to an update management method of updating computer software.

BACKGROUND

In a cluster system in which a plurality of computers are connected, maintenance is performed upon these computers (hereinafter also referred to as nodes) without stopping the operations of the computers. Examples of maintenance performed upon a node include program updating. A software program implemented in a computer is updated as appropriate for various reasons. For example, in order to correct a bug (program error or program defect), extend the function of the computer, or fix a security hole (remove a weakness compromising the safety of a system), program updating is performed.

In the case of a certain type of program implemented in a system such as a cluster system in which a plurality of nodes operate in synchronization with each other, it is required that the versions (version numbers) of such programs be the same in all the nodes. If these programs are updated, it is required to update them at the same timing. Japanese Unexamined Patent Application Publication No. 10-334020 discloses a technique for transmitting information required for configuration change to all agents and then transmitting a configuration change start instruction to each of these agents. Using this technique, the configuration changes of the agents can be performed at the same timing.

SUMMARY

An update management method of causing a management node for managing a program update time to execute the steps of: in response to a program update instruction, referring to update management information stored in an update management table in which a plurality of managed nodes are classified into a plurality of groups and a program update sequence of the groups is defined, and sequentially selecting the groups in accordance with the program update sequence in such a manner that after program update processing has been completed in all of the managed nodes which are included in the last selected one of the groups, the next one of the groups is selected; referring to the update management table and transmitting a program update request to each of the managed nodes which are included in one of the groups which has been selected; and receiving an update completion notification from each of the managed nodes to which the program update request has been transmitted, and setting information indicating that program update processing has been completed in one of the managed nodes which has transmitted the update completion notification in the update management information storing means.

BRIEF DESCRIPTION OF THE DRAWINGS

FIG. 5 is a diagram illustrating the exemplary data structure of an update management information storage unit;

DESCRIPTION OF THE PREFERRED EMBODIMENTS

An embodiment of the present invention will be described with reference to the accompanying drawings.

Figure 1:
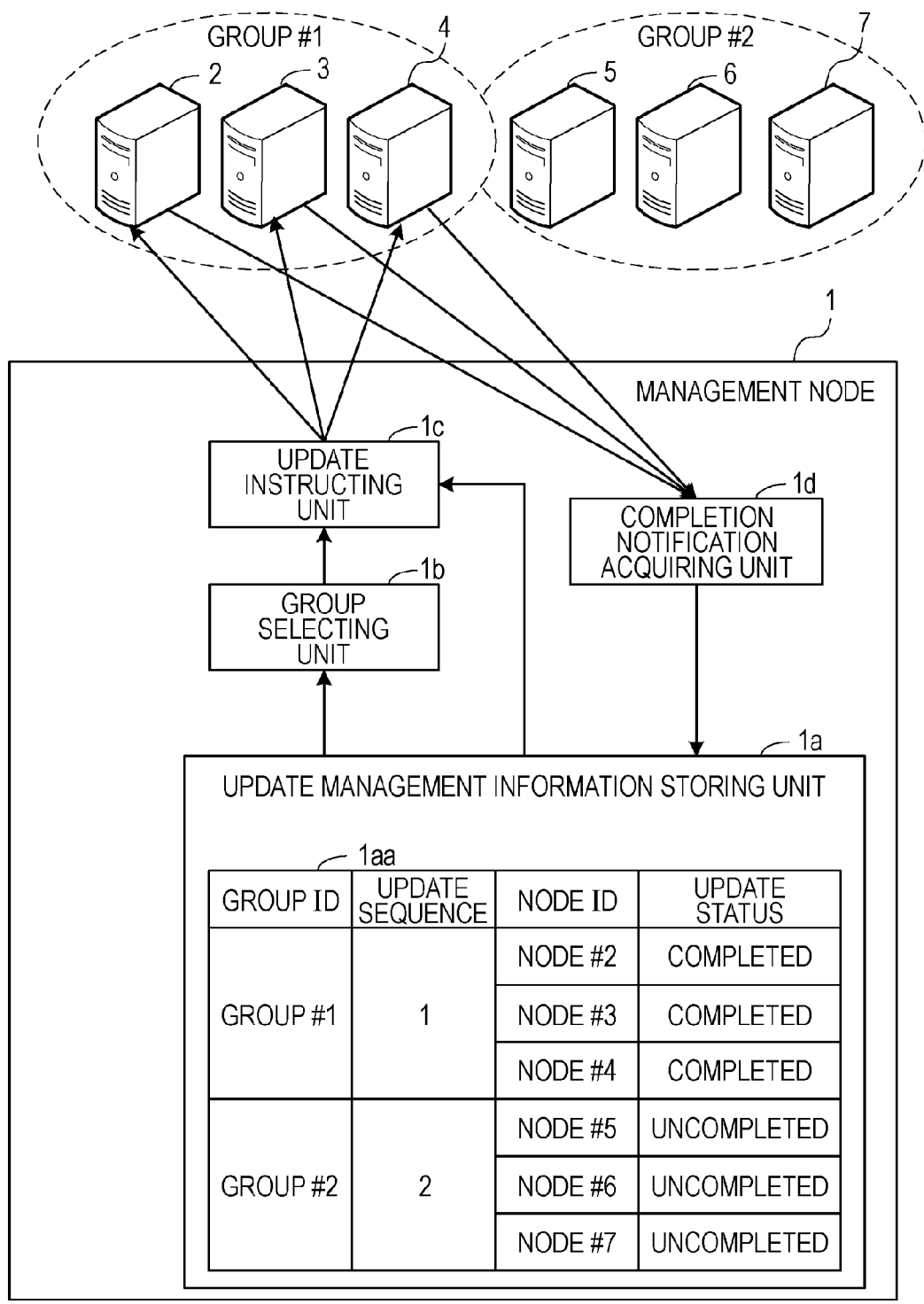
FIG. 1 is a schematic diagram illustrating a cluster system according to an embodiment of the present invention.

FIG. 1 is a schematic diagram illustrating a cluster system according to an embodiment of the present invention. A cluster system includes a management node 1 and a plurality of managed nodes 2 to 7. The management node 1 includes an update management information storing unit 1a, group selecting unit 1b, update instructing unit 1c, and completion notification acquiring unit 1d which are used to manage update times of programs implemented in these managed nodes included in the cluster system. Each unit includes a computer processor programmed to perform the described function.

The update management information storing unit 1a stores an update management table 1aa in which the managed nodes 2 to 7 are classified into a plurality of groups and the sequence of updating of the groups is defined. In an example illustrated in FIG. 1, first, a group including the managed nodes 2 to 4 is updated. Subsequently, a group including the managed nodes 5 to 7 is updated. As illustrated in FIG. 1, in the update management table 1aa, in addition to the sequence of updating the groups, an update status indicating whether updating has been completed can be set for managed nodes included in each of the groups.

In response to a program update instruction, the group selecting unit 1b refers to the update management information storing unit 1a and selects one of the groups which has the earliest update order. After update processing has been performed upon all managed nodes included in the selected group, the group selecting unit 1b sequentially selects the other ones of the groups in accordance with the update sequence. For example, the program update instruction is input into the group selecting means 1b by an administrator. Alternatively, when the newest program (copy source program) is registered in a predetermined place on the basis of an operation input signal input by an administrator, the program update instruction may be input into the group selecting unit 1b using a program registration function (copy source program update function).

The update instructing unit 1c refers to the update management table 1aa, and transmits a program update request to each of managed nodes included in the group selected by the group selecting unit 1b. For example, if the group selecting unit 1b selects the managed nodes 2 to 4, the update instructing unit 1c transmits a program update request to each of the managed nodes 2 to 4.

The completion notification acquiring unit 1d receives an update completion notification from each of the managed nodes to which the update instructing unit 1c has transmitted the program update requests, and notifies the group selecting unit 1b of the completion of program updating of the managed nodes using the update management table 1aa. That is, in the update management table 1aa, the completion notification acquiring means 1d changes the update statuses of the managed nodes that have transmitted the update completion notifications to "completed". As a result, when the group selecting unit 1b refers to the update management information storing unit 1a, it can determine that the program updating of the managed nodes that has transmitted the update completion notifications has been completed (it can receive the notification of the completion of program updating of the managed nodes).

Thus, in the management node 1, one of the groups which has the earliest update order is selected, and an update request is transmitted to the managed nodes 2 to 4 included in the selected group. After the program updating of all of the managed nodes 2 to 4 included in the selected group has been completed, the next group is selected in accordance with the update sequence and an update request is transmitted to the managed nodes 5 to 7 included in the selected next group. As a result, the program updating of all of the managed nodes 2 to 7 can be prevented from being performed at the same time. This can prevent the occurrence of multiple faults due to program updating.

In this embodiment, examples of a program to be updated include a program requiring the reboot of an OS (Operating System) when being updated and a program requiring the restart of the program itself when being updated. The reboot of an OS and the restart of the program are required to change a program operation environment and details of processing performed by a memory-resident program.

Examples of such a program requiring the reboot of an OS or the restart of the program itself when being updated include a control program for controlling an operation environment in each managed node. For example, if load sharing between managed nodes is performed, a control program for collecting pieces of load information and changing the amount of processing per unit time as appropriate is used. If the copy of stored data is transferred to another managed node for the generation of redundant data, a control program for managing a managed node or a place to which the copy is to be transferred is used. If these programs are stopped in a managed node, operational reliability is reduced. As a result, the entire service of the managed node may have to be stopped.

An embodiment of the present invention will be described in detail below using exemplary control program update processing. The control program update processing can be broadly divided into a control program copy stage (including updating of a program in an auxiliary area) and a copied control program activation stage (that is, the activation of a program in an auxiliary area). In the control program update processing, at the time of the activation of the copied control program, the reboot of an OS or the restart of the control program is performed. Accordingly, in the following embodiment, the occurrence of multiple faults is prevented by controlling an activation sequence during updating.

Figure 2:
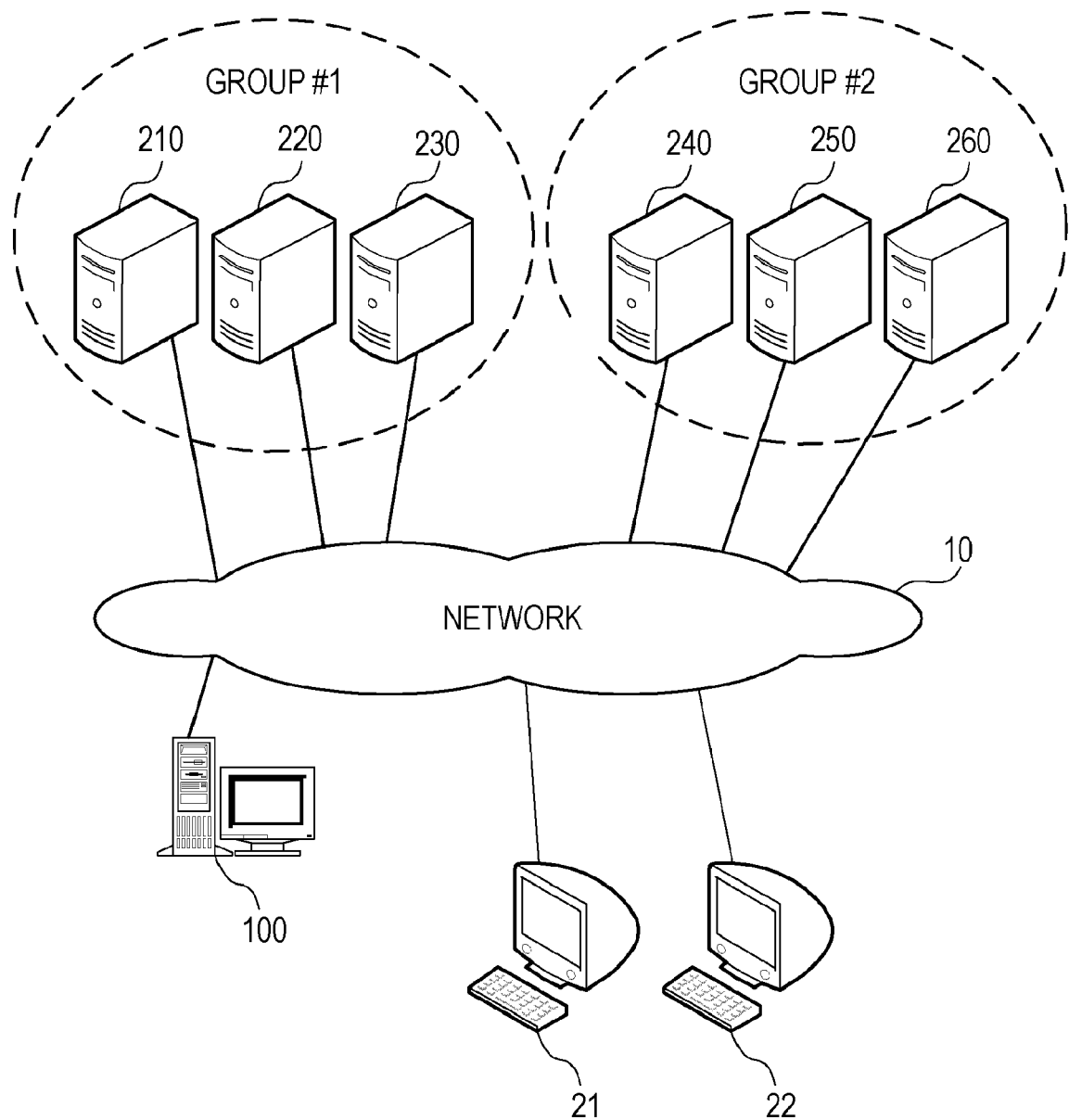
FIG. 2 is a diagram illustrating the exemplary configuration of a cluster system according to an embodiment of the present invention.

FIG. 2 is a diagram illustrating the exemplary configuration of a cluster system according to this embodiment. In this cluster system, client terminals 21 and 22 are connected via a network 10 to a plurality of managed nodes 210, 220, 230, 240, 250, and 260 for performing processing in response to a processing request transmitted from each of the client terminals 21 and 22. A management node 100 performs control program update processing upon the managed nodes 210, 220, 230, 240, 250, and 260 connected thereto via the network 10.

In the management node 100, the managed nodes 210, 220, 230, 240, 250, and 260 are identified by managed node Ids "node #1", "node #2", "node #3", "node #4", "node #5", and "node #6", respectively.

The network 10 is connected to the client terminals 21 and 22. In response to an operation input signal input by a user, each of the client terminals 21 and 22 transmits a processing request to one of the managed nodes 210, 220, 230, 240, 250, and 260.

The managed nodes 210, 220, 230, 240, 250, and 260 included in the cluster system are classified into a plurality of groups. In an example illustrated in FIG. 2, three managed nodes, that is, the managed nodes 210, 220, and 230, form a single group to which a group ID "group #1" is assigned. The other three managed nodes, that is, the managed nodes 240, 250, and 260, form a single group to which a group ID "group #2" is assigned. The grouping is defined in advance in the management node 100 by an administrator.

Each group includes a plurality of managed nodes. Even if these managed nodes are simultaneously stopped, the entire service of a cluster system is not stopped (multiple faults are not generated). For example, it is assumed that a plurality of services are provided in a cluster system, and each of the services is provided in a plurality of managed nodes. In this case, grouping is performed so that at least one of the managed nodes for providing the same service is included in each of all groups. There is a case in which the managed nodes 210, 220, 230, 240, 250, and 260 included in the cluster system provide the same service. In this case, the contents of service are not required to be taken into consideration when grouping is performed.

Figure 3:
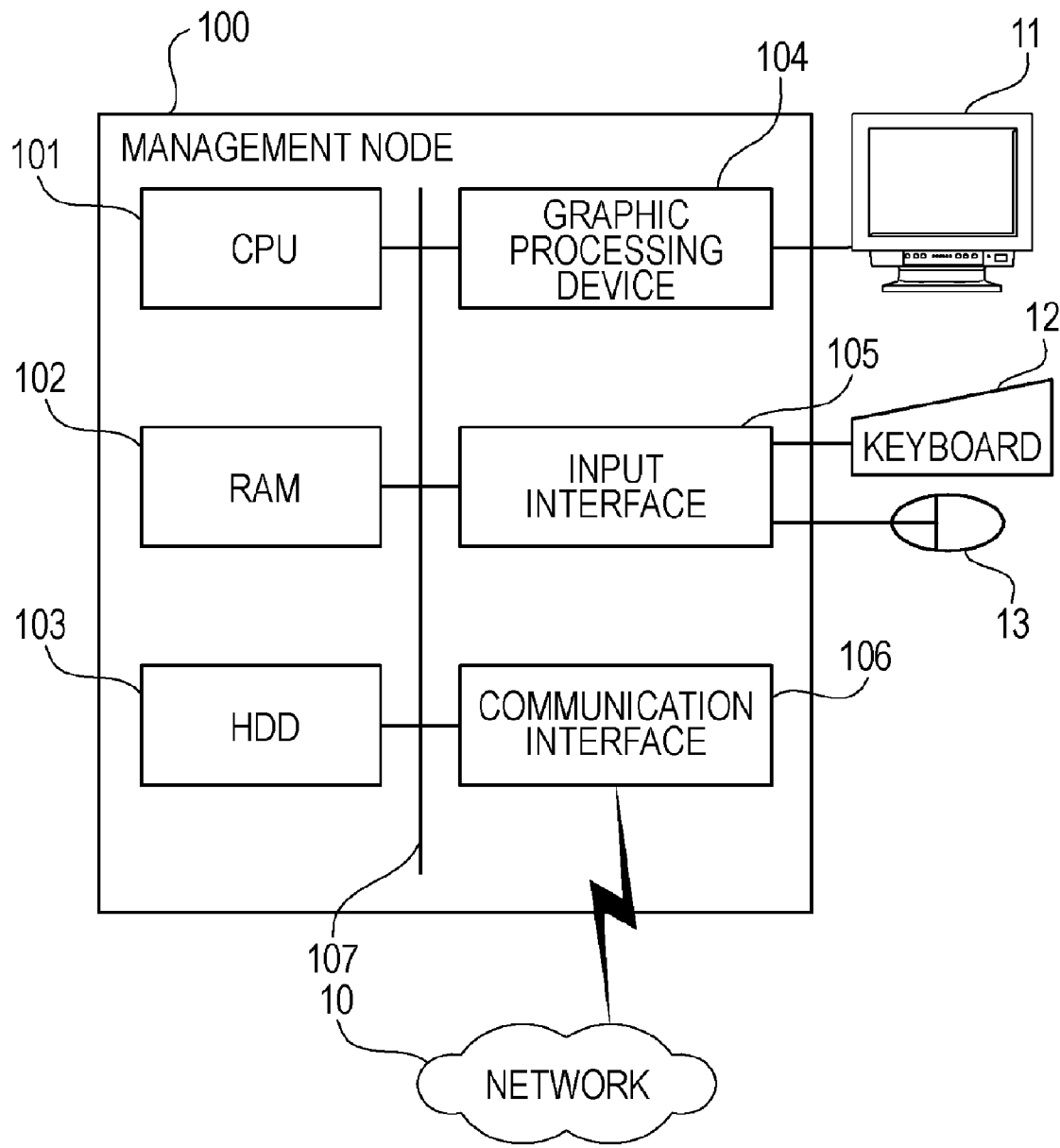
FIG. 3 is a diagram illustrating the exemplary hardware configuration of a management node according to an embodiment of the present invention.

FIG. 3 is a diagram illustrating the exemplary hardware configuration of a management node according to this embodiment. A CPU (Central Processing Unit) 101 performs the overall control of the management node 100. The CPU 101 is connected via a bus 107 to a non-transitory computer readable storage medium such as a RAM (Random Access Memory) 102 and/or an HDD (Hard Disk Drive) 103, a graphic processing device 104, an input interface 105, and a communication interface 106.

The RAM 102 temporarily stores a program for an OS and at least part of an application program which are to be executed by the CPU 101. Furthermore, the RAM 102 stores various pieces of data required for the processing of the CPU 101. The HDD 103 stores an OS and an application program.

The graphic processing device 104 is connected to a monitor 11. In response to a command transmitted from the CPU 101, the graphic processing device 104 displays an image on the screen of the monitor 11. The input interface 105 is connected to a keyboard 12 and a mouse 13. The input interface 105 transmits a signal sent from the keyboard 12 or the mouse 13 to the CPU 101 via the bus 107. The communication interface 106 is connected to the network 10. The communication interface 106 exchanges data with another computer via the network 10.

Using the above-described hardware configuration, processing functions according to this embodiment can be achieved. Although the hardware configuration of the management node 100 is illustrated in FIG. 3, the managed nodes 210, 220, 230, 240, 250, and 260 and the client terminals 21 and 22 can have the same hardware configuration.

Next, the functions of the management node 100 and the managed nodes 210, 220, 230, 240, 250, and 260 will be described.

Figure 4:
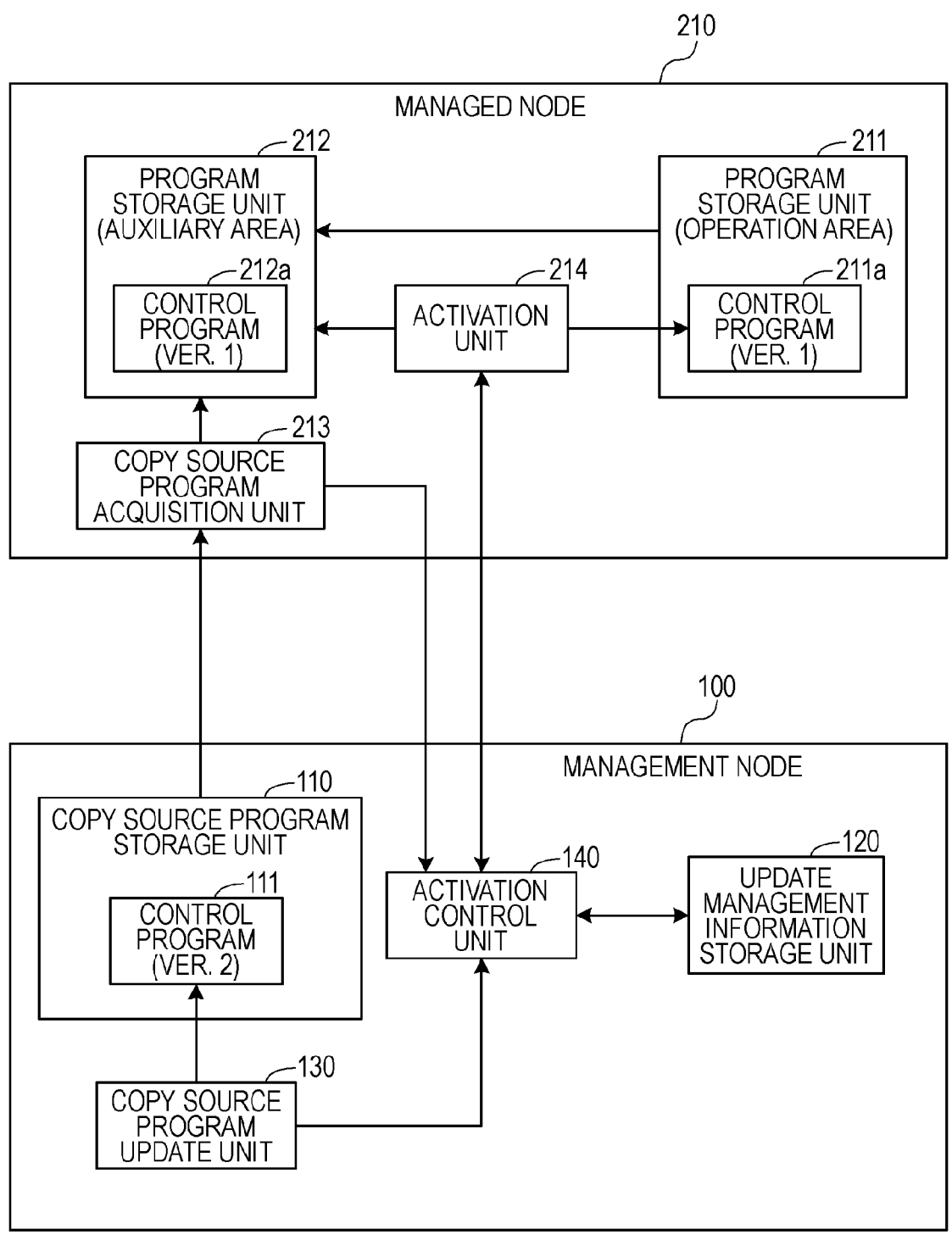
FIG. 4 is a block diagram illustrating the functions of a management node and a managed node.

FIG. 4 is a block diagram illustrating the functions of a management node and a managed node. In FIG. 4, the function of the managed node 210 is illustrated as a representative example. However, the function of each of the managed nodes 220, 230, 240, 250, and 260 is the same as that of the managed node 210.

The management node 100 includes a copy source program storage unit 110, an update management information storage unit 120, a copy source program update unit 130, and an activation control unit 140.

The copy source program storage unit 110 is a storage function of storing the newest program, that is, a control program 111, to be installed on the managed nodes 210, 220, 230, 240, 250, and 260. For example, a part of the HDD 103 is used as the copy source program storage unit 110.

The update management information storage unit 120 performs a storage function of storing the sequence of updating of control programs executed in the managed nodes 210, 220, 230, 240, 250, and 260 and the processing statuses of the control program updating of the managed nodes 210, 220, 230, 240, 250, and 260. For example, a part of the HDD 103 is used as the update management information storage unit 120. In the update management information storage unit 120, the managed nodes are classified into groups and the sequence of control program updating of the groups is set.

The copy source program update unit 130 stores the control program 111 in the copy source program storage unit 110 in response to an operation input signal input by an administrator. For example, the control program 111 is transferred to the copy source program storage unit 110 via the network 10. Furthermore, the copy source program update unit 130 can store the control program 111 created by an editor or a compiler (not illustrated) included in the management node 100 in the copy source program storage unit 110. If the copy source program update unit 130 stores the control program 111, which is the newest control program, in the copy source program storage unit 110, it notifies the activation control unit 140 of the storage of the control program 111.

The activation control unit 140 instructs the managed nodes 210, 220, 230, 240, 250, and 260 to activate the control program 111 stored in the copy source program storage unit 110 (transmits an activation request to these managed nodes). That is, the activation control unit 140 includes the group selecting unit 1b, the update instructing unit 1c, and the completion notification acquiring unit 1d which are illustrated in FIG. 1. In a system illustrated in FIG. 4, since the newest control program is copied to the managed nodes 210, 220, 230, 240, 250, and 260 in advance, the management node 100 controls the activation time of the newest program. Accordingly, the activation control unit 140 transmits an activation request to each of the managed nodes 210, 220, 230, 240, 250, and 260 instead of the update request described with reference to FIG. 1. The update request and the activation request are pieces of information used to specify a time at which the operation of the system is started using the newest control program.

More specifically, upon receiving from the copy source program update unit 130 a notification that the control program 111, which is the newest control program, has been stored in the copy source program storage unit 110, the activation control unit 140 initializes update management information stored in the update management information storage unit 120. Subsequently, the activation control unit 140 receives from each of the managed nodes 210, 220, 230, 240, 250, and 260 a notification that the copying of a copy source program has been completed, and stores information indicating which of the managed nodes has transmitted a copy completion notification thereto in the update management information storage unit 120.

If the activation control unit 140 receives copy completion notifications from all of the managed nodes 210, 220, 230, 240, 250, and 260, it sequentially instructs the managed nodes 210, 220, 230, 240, 250, and 260 to activate the control program 111 in accordance with the sequence set in the update management information storage unit 120. At that time, after checking that activation processing has been completed in all managed nodes included in a selected group, the activation control unit 140 instructs managed nodes included in the next group to activate the control program 111. The activation control unit 140 can check whether activation processing has been completed in each managed node using an activation completion notification transmitted from the managed node to which it has transmitted an activation instruction.

The activation control unit 140 manages pieces of information each indicating whether activation processing has been completed in a managed node using the update management information storage unit 120. That is, upon receiving an activation completion notification from a managed node, the activation control unit 140 stores information indicating which of the managed nodes has transmitted the activation completion notification thereto in the update management information storage unit 120.

The managed node 210 includes two program storage units, that is, program storage units 211 and 212, a copy source program acquisition unit 213, and an activation unit 214.

The program storage unit 211 performs a storage function of storing a control program 211a being used. For example, a part of the storage area of an HDD included in the managed node 210 is used as the program storage unit 211. In the example illustrated in FIG. 4, the version number of the control program 211a being used is "Ver. 1".

The program storage unit 212 performs a function of storing a control program 212a that is an auxiliary control program. For example, a part of the storage area of an HDD included in the managed node 210 is used as the program storage unit 212. The copy of the control program 111 which has been acquired from the management node 100 is stored in the program storage unit 212 that is an auxiliary area.

The copy source program acquisition unit 213 periodically refers to the copy source program storage unit 110 included in the management node 100. If the control program 111, which is the newest control program, is stored in the copy source program storage unit 110, the copy source program acquisition unit 213 stores the copy of the control program 111 in the program storage unit 212.

In response to an activation instruction transmitted from the management node 100, the activation unit 214 activates an auxiliary control program stored in the program storage unit 212 that is an auxiliary area. In the activation processing of an auxiliary control program, the function of the control program 211a being used is stopped and the auxiliary control program is activated. The reboot of an OS of the managed node 210 may be performed as appropriate. If the reboot of the OS is performed, the activation unit 214 and the copy source program acquisition unit 213 are automatically activated after the reboot of the OS has been completed.

The copy source program storage unit 110 included in the management node 100 stores the control program 111 or only a difference part of the control program 111. The difference part of the control program 111 is a patch file used to correct a default or an add-on program used to extend a function. If the patch file or the ad-on program is stored in the copy source program storage unit 110, the copy source program acquisition unit 213 included in the managed node 210 updates the control program 212a stored in the program storage unit 212, which is an auxiliary area, using the acquired patch file or the add-on program. By performing the update processing, the version number of the control program stored in the program storage unit 212 is updated to the newest version number.

In FIG. 4, only the control program 111 is illustrated. However, a plurality of programs may be stored and the updating of these programs may be performed at the same time. In this case, for example, a version number management table describing the version number of each program is stored in the copy source program storage unit 110 in advance. In the version number management table, the identification information (for example, a software name) of each stored program, the identification information (for example, a file name and a storage location) of a file storing the program, and the version number of the program are associated with each other and are then registered. In this case, similar version number management tables each used to manage programs stored in a corresponding storage area are also individually stored in the program storage units 211 and 212 included in the managed node 210 in advance. Subsequently, the copy source program acquisition unit 213 compares the version number management table stored in the copy source program storage unit 110 with the version number management table stored in the program storage unit 212 that is an auxiliary area so as to determine whether the newest program is stored in the copy source program storage unit 110.

Next, the data structure of the update management information storage unit 120 will be described.

FIG. 5 is a diagram illustrating the exemplary data structure of an update management information storage unit. The update management information storage unit 120 stores an update management table 121. The update management table 121 is a data table in which pieces of information about control program update processing are registered. The update management table 121 includes a group ID field, an activation sequence field, a node ID field, a copy status field, and an activation status field.

In the group ID field, identification information (a group ID) is set for each of the groups into which a plurality of managed nodes in a cluster system are classified.

In the activation sequence field, a control program update processing order is set for each group.

In the node ID field, identification information (a node ID) is set for each of the managed nodes. In the copy status field, information indicating whether the copying of a copy source control program has been completed is set for each of the managed nodes. More specifically, "completed" is set for a managed node to which the copy source control program has been copied, and "uncompleted" is set for a managed node to which the copy source control program has not yet been copied.

In the activation status field, information indicating whether the activation of the newest control program has been completed is set for each of the managed nodes. More specifically, "completed" is set for a managed node in which the activation of the newest control program has been completed, and "uncompleted" is set for a managed node in which the activation of the newest control program has not yet been completed.

In the update management table 121, the values of the group ID field, the activation sequence field, and the node ID field are set in advance by a system administrator. Even if the initialization of the update management table 121 is performed, these values are maintained. At that time, the messages of the other fields, that is, the copy status field and the activation status field, are changed to "uncompleted". After the initialization of the update management table 121, the activation control unit 140 changes these messages to "completed" as appropriate.

Using a system having the above-described configuration, the updating of a control program is performed. If a control program is updated, an administrator inputs the control program 111, which is the newest program, into the management node 100. Subsequently, the copy source program update unit 130 stores the control program 111 in the copy source program storage unit 110.

Each of the managed nodes 210, 220, 230, 240, 250, and 260 refers to the copy source program storage unit 110 included in the management node 100 and stores the copy of the control program 111 in its program storage area.

Figure 6:
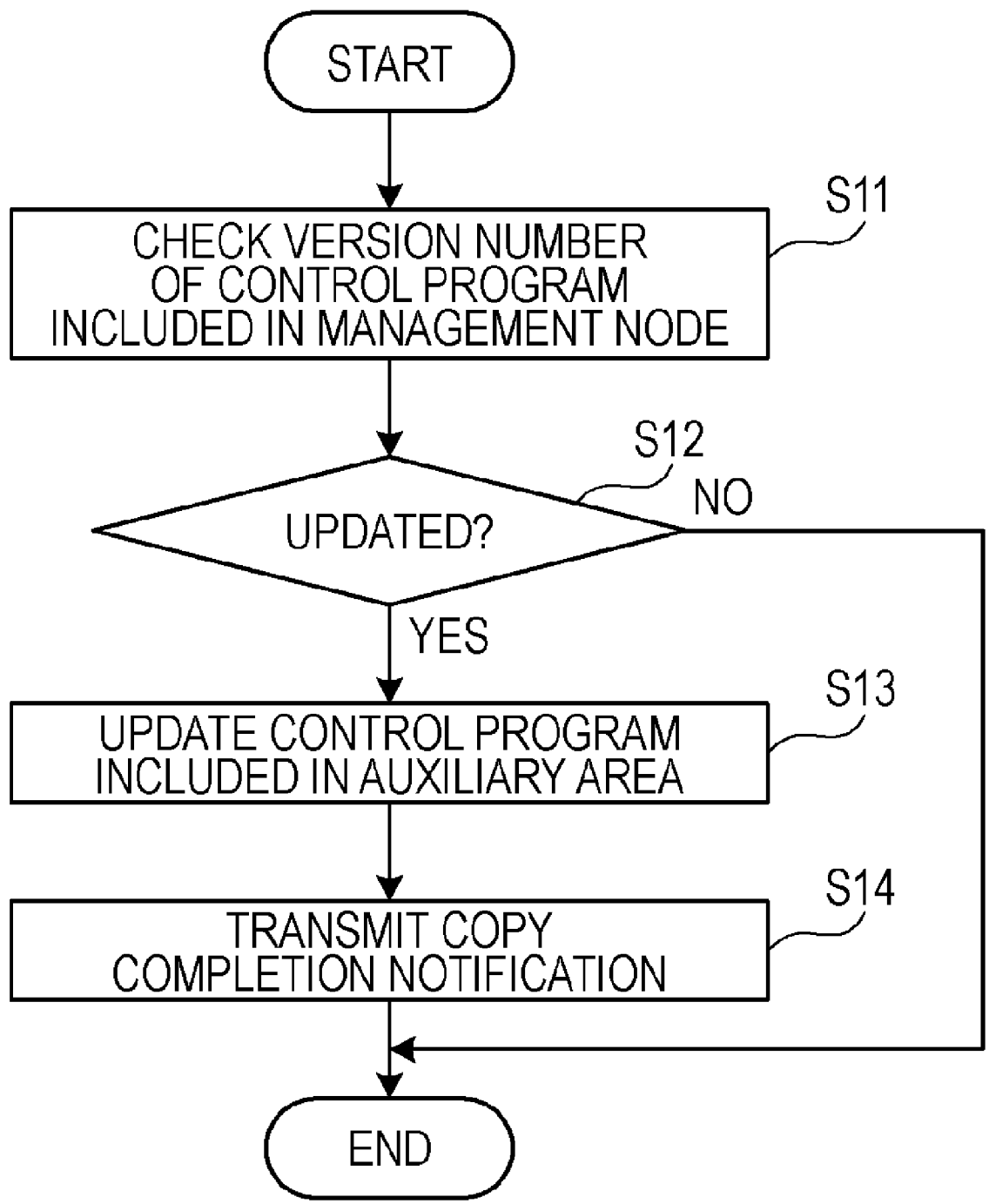
FIG. 6 is a flowchart illustrating a control program copy process performed in each managed node.

FIG. 6 is a flowchart illustrating a control program copy process performed in each managed node. The control program copy process will be described with reference to FIG. 6. This process is performed at predetermined intervals set in advance.

Step S11

The copy source program acquisition unit 213 included in the managed node 210 checks the version number of a control program stored in the management node 100. More specifically, the copy source program acquisition unit 213 accesses the copy source program storage unit 110 included in the management node 100 so as to check the version number of the control program 111 stored in the copy source program storage unit 110. The version number of the control program 111 may be set in the properties of a file storing the control program 111 (in pieces of information about a file attribute). In this case, the copy source program acquisition unit 213 refers to the properties of the control program 111 so as to acquire information about a version number. Alternatively, a character string denoting the version number may be added to the name of a file storing the control program 111. In this case, the copy source program acquisition unit 213 extracts the character string denoting the version number from the file name.

Step S12

The copy source program acquisition unit 213 determines whether the control program 111 stored in the copy source program storage unit 110 has been updated to the newest version. More specifically, the copy source program acquisition unit 213 checks the version number of the control program 211a being used and compares the version number with the version number of the control program 111 which has been checked in step S11. If the version number of the control program 111 is later than that of the control program 211a, the copy source program acquisition unit 213 determines that the control program 111 has been updated to the newest version. On the other hand, if the version number of the control program 111 is the same as or earlier than that of the control program 211a, the copy source program acquisition unit 213 determines that the control program 111 has not been updated to the newest version. If the control program 111 has been updated to the newest version, the process proceeds to step S13. On the other hand, if the control program 111 has not been updated to the newest version, the process ends.

Step S13

The copy source program acquisition unit 213 updates a control program stored in an auxiliary area (the program storage unit 212). More specifically, the copy source program acquisition unit 213 acquires the copy of the control program 111 stored in the copy source program storage unit 110 included in the management node 100 and stores the acquired copy in the program storage unit 212. At that time, the copy source program acquisition unit 213 deletes the control program 212a having an older version number stored in the program storage unit 212.

Step S14

The copy source program acquisition unit 213 transmits a copy completion notification to the management node 100.

Thus, the managed node 210 can acquire the control program 111, which is the newest program, and update the control program stored in the program storage unit 212, which is an auxiliary area, with the control program 111. The control program copy process performed by the managed node 210 has been described with reference to FIG. 6. However, the other managed nodes, that is, the managed nodes 220, 230, 240, 250, and 260, perform the same control program copy process.

Next, a control program activation process performed in each of the managed nodes 210, 220, 230, 240, 250, and 260 will be described.

Figure 7:
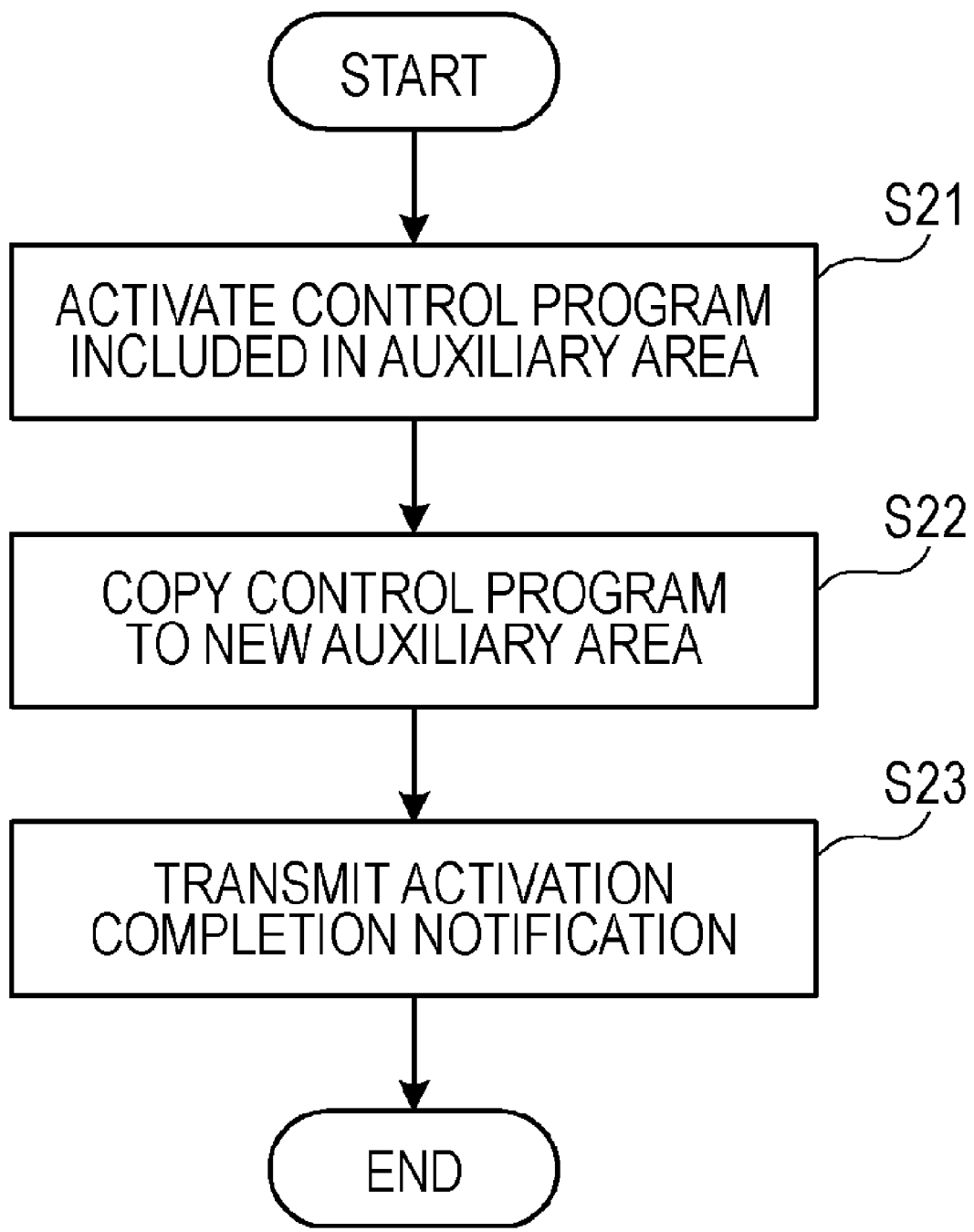
FIG. 7 is a flowchart illustrating an activation process performed in each managed node.

FIG. 7 is a flowchart illustrating an activation process performed in each managed node. The activation process will be described with reference to FIG. 7.

Step S21

Upon receiving an activation request from the management node 100, the activation unit 214 included in the managed node 210 performs the activation processing of a control program stored in the program storage unit 212 that is an auxiliary area. More specifically, first, the activation unit 214 stops the operation of the control program 211a being used stored in the program storage unit 211. Subsequently, the activation unit 214 activates the control program 212a stored in the program storage unit 212 that is an auxiliary area. At that time, if the reboot of an OS is required, the control program 212a is activated after the reboot of an OS has been completed. As a result, the program storage unit 212 used as an auxiliary area becomes an operation area.

Step S22

The activation unit 214 creates a program storage area to be used as a new auxiliary area, and copies the control program being used to the created new program storage area. At that time, the activation unit 214 may delete the control program 211a having an older version number stored in the program storage unit 211 and set the program storage unit 211 as a new auxiliary area.

Step S23

The activation unit 214 transmits an activation completion notification to the management node 100.

Thus, the activation of a control program stored in an auxiliary area can be performed in response to an activation request.

Next, a control program update process performed in the management node 100 will be described.

Figure 8:
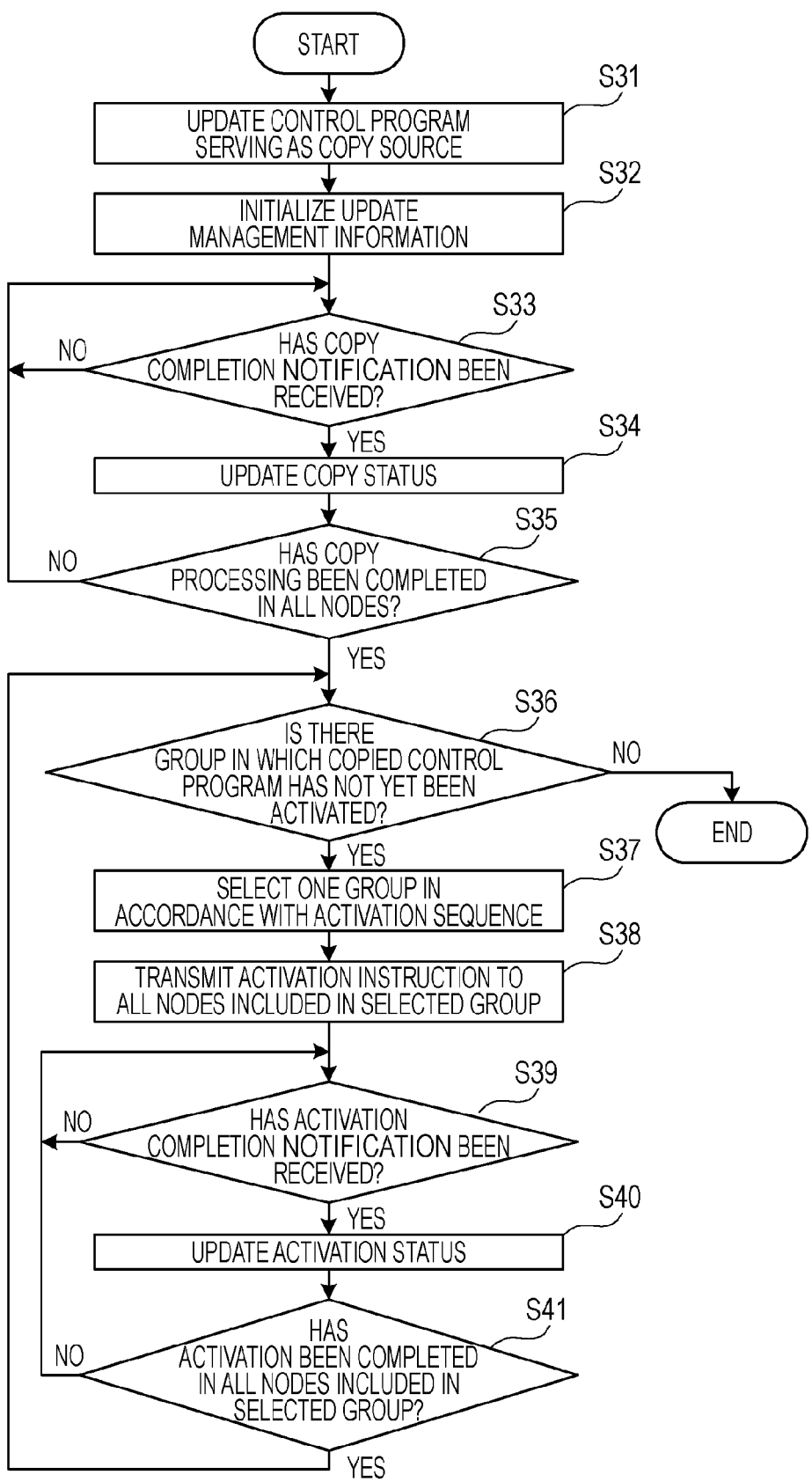
FIG. 8 is a flowchart illustrating a control program update process performed in a management node.

FIG. 8 is a flowchart illustrating a control program update process performed in a management node. The control program update process will be described with reference to FIG. 8.

Step S31

The copy source program update unit 130 updates a control program serving as a copy source. More specifically, the copy source program update unit 130 stores the control program 111 that is the newest control program in the copy source program storage unit 110 in response to an operation input signal input by an administrator. Subsequently, the copy source program update unit 130 notifies the activation control unit 140 that the control program has been updated.

Step S32

The activation control unit 140 initializes the update management table 121 stored in the update management information storage unit 120. As a result, all messages included in the copy status field and the activation status field in the update management table 121 are changed to "uncompleted".

Step S33

The activation control unit 140 determines whether a copy completion notification has been transmitted from each of the managed nodes 210, 220, 230, 240, 250, and 260. If a copy completion notification has been transmitted from each of the managed nodes 210, 220, 230, 240, 250, and 260, the process proceeds to step S34. On the other hand, if a copy completion notification has not yet been transmitted from each of the managed nodes 210, 220, 230, 240, 250, and 260, the processing of step S33 is repeated until copy completion notifications are acquired from all of the managed nodes 210, 220, 230, 240, 250, and 260.

Step S34

The activation control unit 140 updates the copy status of each managed node that has transmitted a copy completion notification thereto. More specifically, the activation control unit 140 changes the message of the copy status field of the managed node from which the copy completion notification has been transmitted thereto to "completed" in the update management table 121.

Step S35

The activation control unit 140 determines whether copy processing has been completed in all the managed nodes. More specifically, the activation control unit 140 refers to the update management table 121. If all the messages included in the copy status field in the update management table 121 are "completed", the activation control unit 140 determines that copy processing has been completed in all the managed nodes. On the other hand, if the message "uncompleted" remains in the copy status field, the activation control unit 140 determines that there is a managed node in which copy processing has not yet been completed. If the copy processing has been completed in all the managed nodes, the process proceeds to step S36. On the other hand, if there is a managed node in which the copy processing has not yet been completed, the process proceeds to step S33.

Step S36

If the copy processing of the newest control program has been completed in all the managed nodes, the activation control unit 140 determines whether all of the managed nodes have activated the copy of the newest control program. More specifically, the activation control unit 140 refers to the update management table 121. If all the messages included in the activation status field are "completed", the activation control unit 140 determines that the activation processing has been completed in all the managed nodes. On the other hand, if the message "uncompleted" remains in the activation status field, the activation control unit 140 determines that the activation processing has not yet been performed upon a group including a managed node whose activation status is "uncompleted". If there is a group on which the activation processing has not yet been performed, the process proceeds to step S37. If the activation processing has been performed upon all groups, the process ends.

Step S37

The activation control unit 140 selects a group having the highest priority from among groups on which the activation processing has not yet been performed in accordance with the activation sequence. More specifically, the activation control unit 140 refers to the update management table 121 and selects a group having the smallest value of the activation order from among groups whose activation statuses remains "uncompleted".

Step S38

The activation control unit 140 transmits an activation request to all managed nodes included in the group selected in step S37.

Step S39

The activation control unit 140 determines whether an activation completion notification has been transmitted thereto from any one of the managed nodes to which the activation request was transmitted. If the activation control unit 140 has received the activation completion notification, the process proceeds to step S40. On the other hand, if the activation control unit 140 has not yet received the activation completion notification, the processing of step S39 is repeated until the activation completion notification is transmitted from any one of the managed nodes.

Step S40

The activation control unit 140 updates the activation status. More specifically, the activation control unit 140 changes the activation status of the managed node that has transmitted the activation completion notification thereto to "completed" in the update management table 121.

Step S41

The activation control unit 140 determines whether the activation processing has been completed in all the managed nodes included in the group selected in step S37. More specifically, the activation control unit 140 refers to the update management table 121. If the activation statuses of all the managed nodes included in the group selected in step S37 denote "completed", the activation control unit 140 determines that the activation processing has been completed in all the managed nodes. If the activation status of at least one of the managed nodes denotes "uncompleted", the activation control unit 140 determines that there is a managed node in which the activation processing has not yet been completed. If the activation processing has been completed in all the managed nodes, the process proceeds to step S36. On the other hand, if there is a managed node in which the activation processing has not yet been completed, the process proceeds to step S39.

Thus, the updating processing of a control program is sequentially performed upon groups. An example of the control program update process will be described with reference to FIGS. 9 and 10.

Figure 9:
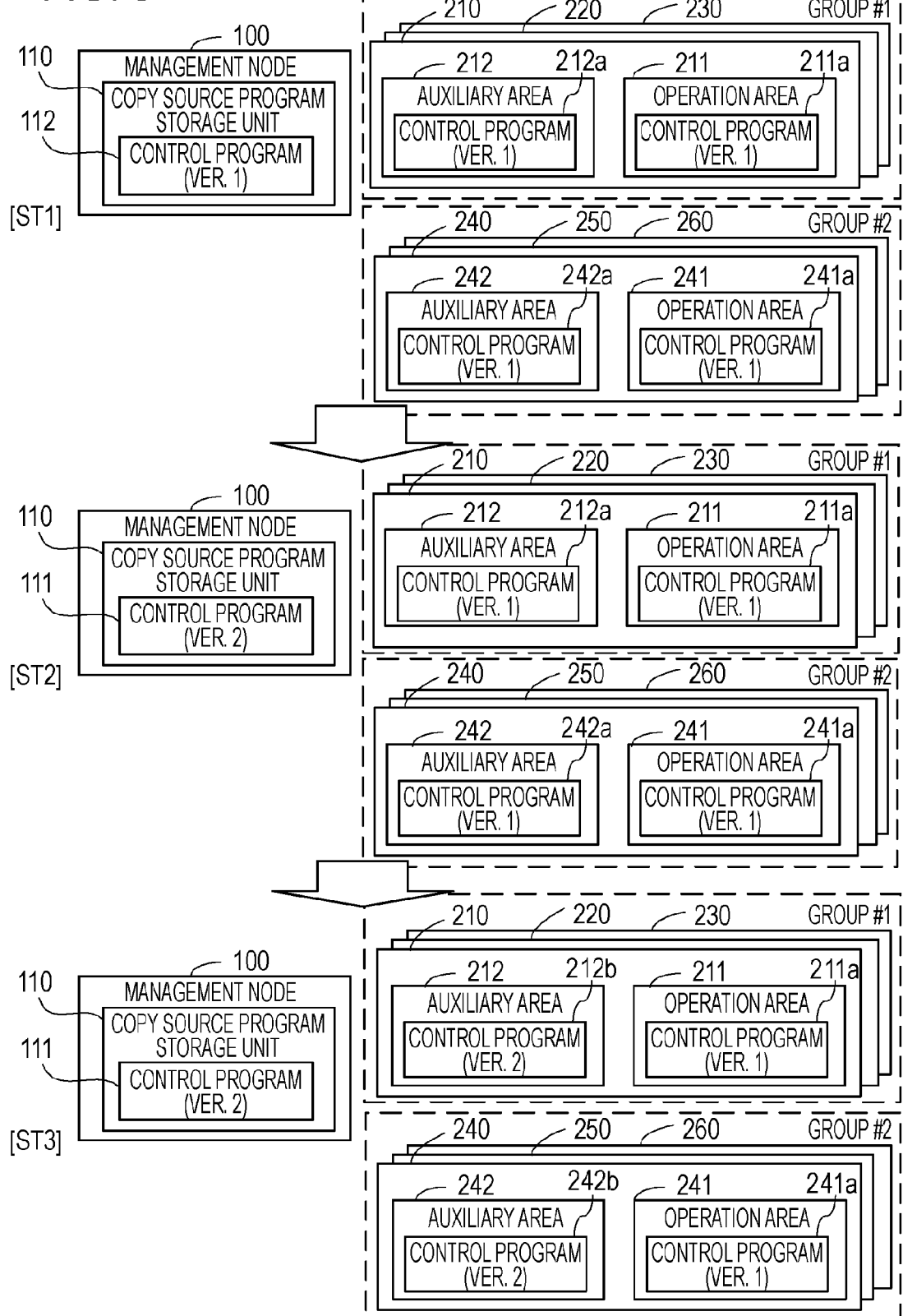
FIG. 9 is a first diagram illustrating a control program update state.

FIG. 9 is a first diagram illustrating a control program update state. A first state (ST1) indicates a state prior to the updating of a control program. Prior to the updating of a control program, a control program 112 having the version number of "Ver. 1" is stored in the management node 100.

The control program 211a having the version number of Ver. 1 is stored in the program storage unit 211 in the operation area of the managed node 210 included in the group having the group ID of "group #1". The control program 212a having the version number of "Ver. 1" is stored in the program storage unit 212 that is the auxiliary area of the managed node 210. A control program having the same number as the control program stored in the operation area of the managed node 210 and a control program having the same number as the control program stored in the auxiliary area of the managed node 210 are stored in the operation area and the auxiliary area of each of the other managed nodes included in the group having the group ID of "group #1", that is, the managed nodes 220 and 230, respectively.

A control program 241a having the version number of "Ver. 1" is stored in a program storage unit 241 that is the operation area of the managed node 240 included in the group having the group ID of "group #2". A control program 242a having the version number of "Ver. 1" is stored in a program storage unit 242 that is the auxiliary area of the managed node 240. A control program having the same number as the control program stored in the operation area of the managed node 240 and a control program having the same number as the control program stored in the auxiliary area of the managed node 240 are stored in the operation area and the auxiliary area of each of the other managed nodes included in the group having the group ID of "group #2", that is, the managed nodes 250 and 260, respectively.

It is assumed that the version numbers of these control programs are updated to "Ver. 2". In this case, an administrator updates the control program 112 stored in the management node 100.

A second state (ST2) indicates a state subsequent to the updating of the control program stored in the management node 100. The control program 111 having the version number of "Ver. 2" is stored in the management node 100 included in the management node 100.

If the control program 112 is updated to the control program 111 in the management node 100, each of the managed nodes 210, 220, 230, 240, 250, and 260 compares the version number of the control program 111 with that of a control program stored in the auxiliary area thereof, and determines that the version number of the control program 111 stored in the management node 100 is higher than that of the control program stored in the auxiliary area thereof. Subsequently, each of the managed nodes 210, 220, 230, 240, 250, and 260 acquires the copy of the control program 111 having the newest version number and updates the control program stored in the auxiliary area thereof with the copy of the control program 111.

A third state (ST3) indicates a state subsequent to the updating of the control program stored in the auxiliary area of each of the managed nodes 210, 220, 230, 240, 250, and 260. In the program storage unit 212 that is the auxiliary area of the managed node 210 included in the group having the group ID of "group #1", the control program 212a having the version number of "Ver. 1" is updated to a control program 212b having the version number of "Ver. 2". Like in the auxiliary area of the managed node 210, in the auxiliary area of each of the other managed nodes included in the group having the group ID of "group #1", that is, the managed nodes 220 and 230, the control program having the version number of "Ver. 1" is updated to a control program having the version number of "Ver. 2".

In the program storage unit 242 that is the auxiliary area of the managed node 240 included in the group having the group ID of "group #2", the control program 242a having the version number of "Ver. 1" is updated to a control program 242b having the version number of "Ver. 2". Like in the auxiliary area of the managed node 240, in the auxiliary area of each of the other managed nodes included in the group having the group ID of "group #2", that is, the managed nodes 250 and 260, the control program having the version number of "Ver. 1" is updated to a control program having the version number of "Ver. 2".

The newest control programs are individually stored in the auxiliary areas of all of the managed nodes 210, 220, 230, 240, 250, and 260. The newest control programs are sequentially activated in order of descending priorities under the control of the management node 100.

Figure 10:
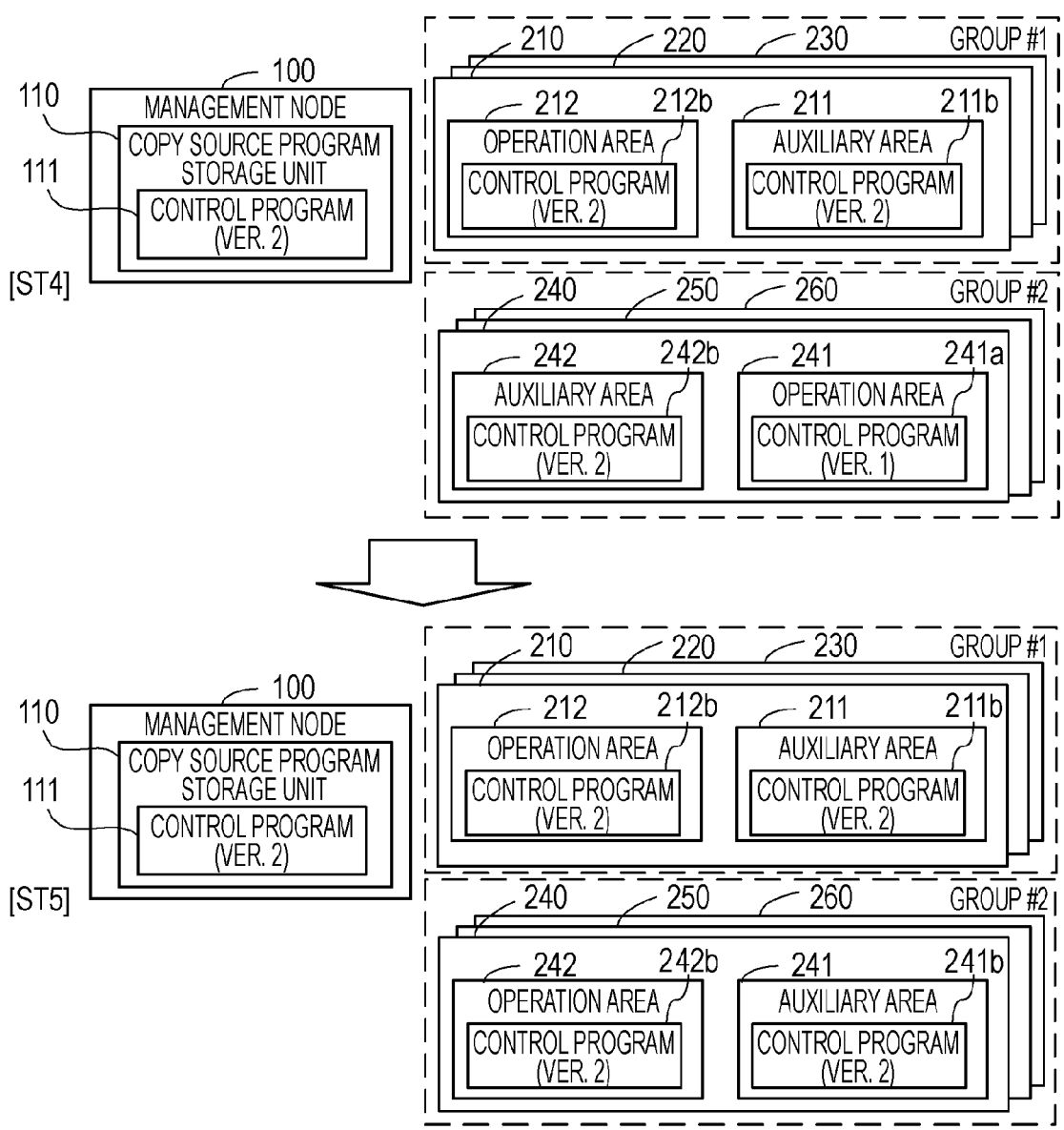
FIG. 10 is a second diagram illustrating a control program update state.

FIG. 10 is a second diagram illustrating a control program update state. Referring to a fourth state (ST4), in the managed node 210 included in the group having the group ID of "group #1", the program storage unit 212 serving as the auxiliary area in the third state (ST3) is set as the operation area. Furthermore, the program storage unit 211 serving as the operation area in the third state (ST3) is set as the auxiliary area, whereby the control program having the version number of "Ver. 1" is updated to a control program 211b having the newest version number of "Ver. 2" in the program storage unit 211. Like in the managed node 210, in each of the other managed nodes included in the group having the group ID of "group #1", that is, the managed nodes 220 and 230, the activation processing of the newest program is similarly performed.

If the activation processing has been completed in all of the managed nodes 210, 220, and 230 included in the group having the group ID of "group #1" which has the higher priority, the activation processing is performed upon the managed nodes 240, 250, and 260 included in another group in response to an instruction transmitted from the management node 100.

Referring to a fifth state (ST5), in the managed node 240 included in the group having the group ID of "group #2", the program storage unit 242 serving as the auxiliary area in the fourth state (ST4) is set as the operation area. Furthermore, the program storage unit 241 serving as the operation area in the fourth state (ST4) is set as the auxiliary area, whereby the control program having the version number of "Ver. 1" is updated to a control program 241b having the newest version number of "Ver. 2" in the program storage unit 241. Like in the managed node 240, in each of the other managed nodes included in the group having the group ID of "group #2", that is, the managed nodes 250 and 260, the activation processing of the newest program is similarly performed.

As described previously, in this embodiment, a plurality of managed nodes included in a cluster system are classified into a plurality of groups. The update processing of a control program is sequentially performed upon these groups in accordance with an update sequence. At that time, after the update processing has been completed in all managed nodes included in one of the groups which has a higher priority, the update processing is performed upon managed nodes included in the next one of the groups. As a result, all of the managed nodes providing the same service can be prevented from being rebooted at the same time. Consequently, control program updating can be performed without stopping the service.

Furthermore, by copying the control program to the managed nodes in advance, the time each of the managed nodes takes to perform processing in response to an update instruction (activation request) transmitted from a management node can be reduced. Consequently, the period during which different groups use the different versions of a control program can be minimized.

In general program update processing, after a program being used has been stopped and deleted, a new program is activated. In this case, the time taken to delete the program being used is required. In this embodiment, however, after a control program stored in an auxiliary area has been activated (step S21 illustrated in FIG. 7), a formerly-used control program is deleted (step S22 illustrated in FIG. 7). Accordingly, a period during which the operation of a control program is stopped for the updating of the control program can be shortened.

In the above-described embodiment, each of the managed nodes 210, 220, 230, 240, 250, and 260 periodically checks whether a control program has been updated. However, the management node 100 may notify each of the managed nodes 210, 220, 230, 240, 250, and 260 that the control program has been updated. For example, the activation control unit 140 included in the management node 100 receives from the copy source program update unit 130 a notification that a control program has been updated with the newest control program, and transmits a control program copy request to each of the managed nodes 210, 220, 230, 240, 250, and 260. The copy source program acquisition unit 213 included in the managed node 210 stores the copy of the control program 111 stored in the copy source program storage unit 110 included in the management node 100 in the program storage unit 212 that is an auxiliary area in response to the control program copy request. Each of the other managed nodes, that is, the managed nodes 220, 230, 240, 250, and 260, similarly acquires the copy of the control program in response to the control program copy request.

The management node 100 may transmit an activation request without checking that the newest control program has been copied to all of the managed nodes 210, 220, 230, 240, 250, and 260. That is, although the management node 100 checks whether the control program has been copied to all of the managed nodes 210, 220, 230, 240, 250, and 260 in the process from step S33 to step S35 in FIG. 8, the process from step S33 to step S35 may be omitted. In this case, after the processing of step S32 has been completed, the process proceeds to step S36. On the other hand, upon receiving the activation request, each of the managed nodes 210, 220, 230, 240, 250, and 260 determines whether the copying of the newest program has been completed. If the copying of the newest program has not yet been completed, each of the managed nodes 210, 220, 230, 240, 250, and 260 acquires the copy of the newest control program from the management node 100 and performs the activation of the acquired copy of the control program.

Figure 11:
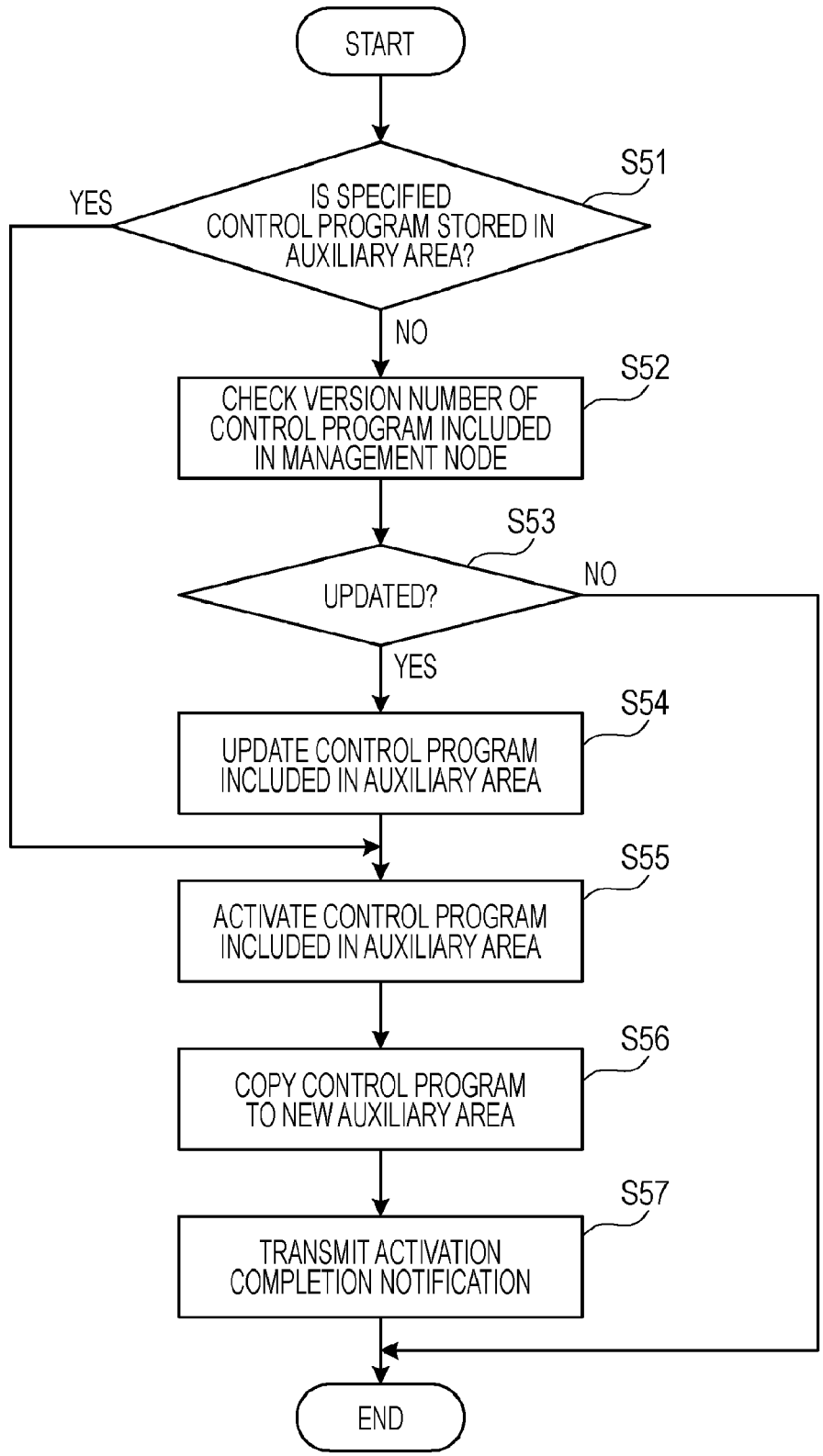
FIG. 11 is a flowchart illustrating an activation process for acquiring a control program at the time of activation.

FIG. 11 is a flowchart illustrating an activation process for acquiring a control program at the time of activation. The activation process will be described with reference to FIG. 11. This process is performed in a managed node (the managed node 210 in the following description) that has received an activation request transmitted from the management node 100. The activation request transmitted from the management node 100 includes information about the version number of the newest control program.

Step S51

The activation unit 214 included in the managed node 210 determines whether the control program having the version number specified by the activation request is stored in the program storage unit 212 that is an auxiliary area. If the control program is stored in the program storage unit 212, the process proceeds to step S55. On the other hand, if the control program is not stored in the program storage unit 212, the process proceeds to step S52.

Step S52

The activation unit 214 requests the copy source program acquisition unit 213 to acquire the newest control program. The copy source program acquisition unit 213 checks the version number of the control program 111 stored in the management node 100.

Step S53

The copy source program acquisition unit 213 determines whether the control program has been updated in the management node 100. More specifically, the copy source program acquisition unit 213 determines whether the control program has been updated by checking whether the version number of the control program stored in the copy source program storage unit 110 included in the management node 100 is the same as the version number specified by the activation request. If the control program has been updated, the process proceeds to step S54. On the other hand, if the control program has not been updated, the process ends.

Step S54

The copy source program acquisition unit 213 updates the control program stored in the auxiliary area (the program storage unit 212). More specifically, the copy source program acquisition unit 213 acquires the copy of the control program 111 stored in the copy source program storage unit 110 included in the management node 100 and stores the copy of the control program 111 in the program storage unit 212. At that time, the copy source program acquisition unit 213 deletes the control program 212a having the older version number stored in the program storage unit 212.

Step S55

The activation unit 214 performs the activation processing of the control program stored in the program storage unit 212. More specifically, the activation unit 214 stops the operation of the control program 211a being used stored in the program storage unit 211, and activates the control program 212a stored in the program storage unit 212. At that time, if the reboot of an OS is required, the control program 212a is activated after the reboot of an OS has been performed. As a result, the program storage unit 212 serving as the auxiliary area is set as an operation area.

Step S56

The activation unit 214 creates a new program storage area to be used as an auxiliary area, and copies the control program being used to the created new program storage area.

Step S57

The activation unit 214 transmits an activation completion notification to the management node 100.

Thus, the newest control program can be acquired in response to an activation request, and the acquired control program can be activated.

The above-described processing functions can be achieved by a computer. In this case, a program in which the processing details of functions required for the managed nodes 210, 220, 230, 240, 250, and 260 and the management node 100 are written is provided for the computer. The computer executes the program, whereby the above-described processing functions can be achieved on the computer. The program in which the processing details are written can be stored in a computer readable recording medium. The computer readable recording medium may be a magnetic recorder such as an HDD, a flexible disk (FD), or a magnetic tape, an optical disc such as a DVD (Digital Versatile Disc) a DVD-RAM, a CD-ROM (Compact Disc-Read-Only Memory), or a CD-R (Recordable)/RW (ReWritable), a magneto-optical recording media such as an MO (Magneto-Optical disc), or a semiconductor memory.

If the program is distributed, for example, portable recording media with the program recorded thereon, such as DVDs or CD-ROMs, are sold. Alternatively, the program may be stored in the storage unit of a server computer, and may be transferred via a network from the server computer to other computers.

A computer for executing the program, for example, stores the program recorded on the portable recording medium or transmitted from the server computer in its own storage unit. The computer reads out the program from its own storage unit and performs processing in accordance with the program. The computer may read out the program directly from the portable recording medium and perform processing in accordance with the program. Alternatively, each time the program is transferred from the server computer to the computer, the computer may perform processing in accordance with the received program.

The present invention is not limited to the above-described embodiment. Various changes can be made to the present invention without departing from the spirit and scope of the present invention.

What is claimed is:

1. A non-transitory computer readable storage medium recording an update management program for causing a computer to manage update times of programs implemented in a plurality of managed nodes included in a cluster system, the update management program causing the computer to execute a process comprising:

a group selecting step of in response to an instruction for updating the programs, causing group selecting means to refer to update management information storing means for storing an update management table in which the plurality of managed nodes are classified into a plurality of groups and a program update sequence of the plurality of groups is defined, and sequentially select the plurality of groups in accordance with the program update sequence in such a manner that after program update processing has been completed in all ones of the plurality of managed nodes which are included in the last selected one of the plurality of groups, the next one of the plurality of groups is selected;

an update instructing step of referring to the update management table and transmitting a program update request to each of the plurality of managed nodes which are included in one of the plurality of groups which has been selected by the group selecting means; and a completion notification acquiring step of receiving an update completion notification from each of plurality of managed nodes to which the program update request has been transmitted, and notifying the group selecting means that program update processing has been completed in one of the plurality of managed nodes which has transmitted the update completion notification.

2. The non-transitory computer readable storage medium according to claim 1, wherein, in the update management table, update status information is associated with each of the plurality of managed nodes and the update status information indicates that program update processing has not yet been completed in an initial state, wherein, in the group selecting step, when pieces of update status information associated with all of the plurality of managed nodes which are included in the last selected one of the plurality of groups indicate that program update processing has been completed in the update management table, it is determined that program update processing has been completed in all of the plurality of managed nodes which are included in the last selected one of the plurality of groups, and wherein, in the completion notification acquiring step, a notification that program update processing has been completed in one of the plurality of managed nodes which has transmitted the update completion notification is transmitted to the group selecting means by changing the update status information associated with that one of the plurality of managed nodes which has transmitted the update completion notification so that the update status information indicates that update processing has been completed.

3. The non-transitory computer readable storage medium according to claim 1, wherein, in the group selecting step, after checking that all of the plurality of managed nodes have acquired the newest program, group selection processing is started.

4. The non-transitory computer readable storage medium according to claim 3, wherein, in the update management table, program acquisition status information is associated with each of the plurality of managed nodes and the program acquisition status information indicates that the newest program has not yet been acquired in an initial state, wherein, in the group selecting step, when pieces of program acquisition status information associated with all of the plurality of managed nodes indicate that the newest program has been acquired in the update management table, it is determined that all of the plurality of managed nodes have acquired the newest program, and wherein the update management program further causes the computer to execute a program acquisition status managing step of receiving from each of the plurality of managed nodes a program acquisition notification indicating that the newest program has been acquired, and changing the program acquisition status information associated with one of the plurality of managed nodes which has transmitted the program acquisition notification so that the program acquisition status information indicates that the newest program has been acquired in the update management table.

5. The non-transitory computer readable storage medium according to claim 1, wherein the update management program further causes the computer to execute a program updating step of, in response to an operation input signal, storing the newest program in program storing means for storing the programs to be distributed to the plurality of managed nodes, and outputting an instruction for updating the programs in the group selecting step.

6. The non-transitory computer readable storage medium according to claim 1, wherein, in the update management table, grouping is performed so that at least one managed node for providing the same service is included in each of the plurality of groups.

7. An update management method of managing update times of programs implemented in a plurality of managed nodes included in a cluster system using a computer, comprising:

in response to an instruction for updating the programs, referring to update management information storing means for storing an update management table in which the plurality of managed nodes are classified into a plurality of groups and a program update sequence of the plurality of groups is defined, and sequentially selecting the plurality of groups in accordance with the program update sequence in such a manner that after program update processing has been completed in all of the plurality of managed nodes which are included in the last selected one of the plurality of groups, the next one of the plurality of groups is selected;

referring to the update management table and transmitting a program update request to each of the plurality of managed nodes which are included in one of the plurality of groups which has been selected; and receiving an update completion notification from each of the plurality of managed nodes to which the program update request has been transmitted, and setting information indicating that program update processing has been completed in one of the plurality of managed nodes which has transmitted the update completion notification in the update management information storing means.

8. A cluster system comprising:

a management node; and a plurality of managed nodes, the plurality of managed nodes each including program storing means for storing a newest program, and updating means for updating an update target program using the newest program stored in the program storing means in response to an update request received from the management node, and transmitting an update completion notification indicating that update processing has been completed to the management node, the management node including update management information storing means for storing an update management table in which the plurality of managed nodes are classified into a plurality of groups and a program update sequence of the plurality of groups is defined, group selecting means for, in response to an instruction for updating the program, referring to the update management information storing means and sequentially selecting the plurality of groups in accordance with the program update sequence in such a manner that after program update processing has been completed in all of the plurality of managed nodes which are included in the last selected one of the plurality of groups, the next one of the plurality of groups is selected, update instructing means for referring to the update management table and transmitting a program update request to each of the plurality of managed nodes which are included in one of the plurality of groups which has been selected by the group selecting means, and completion notification acquiring means for receiving an update completion notification from each of the ones of the plurality of managed nodes to which the program update request has been transmitted, and notifying the group selecting means that program update processing has been completed in one of the plurality of managed nodes which has transmitted the update completion notification.

9. The cluster system according to claim 8, wherein the management node further includes copy source program storing means and program updating means, and the plurality of managed nodes each further includes program acquiring means, the copy source program storing means being means for storing a copy source program to be distributed to each of the plurality of managed nodes, the program acquiring means being means for periodically checking whether the copy source program stored in the copy source program storing means has been updated and storing the copy of the copy source program in the program storing means when the copy source program has been updated, the program updating means being means for storing the newest copy source program in the copy source program storing means in response to an operation input signal and outputting to the group selecting means an instruction for performing program updating using the copy of the copy source program.

* * * * *